Patented Mar. 30, 1943

2,315,346

UNITED STATES PATENT OFFICE 2,315,346

METHOD OF IMPROVING GRAPHITE ELECTRODES

Joseph Arthur Musgrave Woodcock Mitchell, Runcorn, England, assignor to Imperial Chemical Industries Limited, a corporation of Great Britain No Drawing. Application May 10, 1941, Serial No. 392,989. In Great Britain July 3, 1940

2 Claims. (Cl. 13—19)

This invention relates to methods of improving graphite electrodes.

It is known to prepare electrodes of graphite by heating amorphous carbon to very high temperatures, for example temperatures of the order of 2000° C. either before or after shaping it to that of the required electrode. In such processes it is usual to incorporate with the amorphous materials small amounts of binding materials as well as small quantities of non-volatile metallic oxides such as oxides of aluminium, iron, magnesium, titanium and vanadium which catalyse the transition of the carbon from its amorphous condition to the crystalline graphite structure. The metals or metallic compounds remain in the finished electrodes owing to their non-volatility and for many purposes their presence, at least in the surface layers of the electrodes, is disadvantageous. I have now found that this disadvantage can be overcome by subjecting the electrodes still containing small residual amounts of such metallic bodies in their surface layers to a chloridizing treatment at elevated temperatures when these impurities are converted to and volatilised as chlorides of the metals.

According to the present invention, therefore, improved graphite electrodes are produced by subjecting shaped electrodes containing small amounts of metallic impurities to a chloridizing treatment at an elevated temperature and volatilizing away the metallic chlorides so formed. Advantageously the subjection to the chloridizing treatment is effected by exposure of the electrodes to an atmosphere comprising chlorine. Alternatively the shaped electrodes may be impregnated, at least in the surface layers, with a solution of a non-deleterious inorganic chloride such as ammonium chloride, an alkali metal chloride or an alkaline earth metal chloride and then heated to a suitable temperature.

When the electrodes are to be exposed to a chloridizing atmosphere comprising chlorine, the temperature at which the electrodes are subjected to the treatment is preferably such that the chlorides formed are volatilised simultaneously. It will be evident that the temperature may be varied, for example, 900–1000° C. in the case of ferric chloride or 300–600° C. in the case of vanadium chloride, and that the exposure to chlorine is to be continued until the removal of the chlorides from the surface layers is complete. As an alternative, however, the process may be carried out by chloridizing at a lower temperature and subsequently volatilizing the metallic chlorides at the higher temperature. When the removal of the chlorides is complete the excess chlorine may be removed from the electrodes by nitrogen-blowing at the same elevated temperature.

An advantage of the chlorine treatment of the present invention is that it can be combined with the usual process of manufacture in which the shaped ungraphitized carbon electrode containing metallic oxide graphitization catalyst is heated to the transformation temperature, by bringing the chlorine into contact with the resulting graphite electrodes during the subsequent process of cooling.

The following example illustrates but does not limit the invention, all parts being by weight.

Example

Electrodes of 2 inch sides and of square cross section and having a vanadium content which varied from 0.006 per cent at the centre to 0.015 per cent in the surface layers were heated to 500° C. in a small tubular furnace in a current of chlorine for 4 hours. At the end of this time the electrodes were nitrogen-blown to remove the last traces of chlorine and allowed to cool. On analysis it was found that the vanadium content had been reduced to less than 0.0018 per cent in the surface layers and to less than 0.001 per cent at the centre.

In each case the vanadium contents were obtained either by the analysis of borings taken from the centre or of layers one-sixteenth of an inch thick obtained from the surface by careful machine planing. The analytical results which were obtained by a colorimetric method were also checked spectrographically.

I claim:

1. In methods of making improved shaped graphite electrodes wherein shaped carbon electrodes are heated to an elevated temperature sufficient to effect graphitization in the presence of contained catalytic amounts of non-volatile metal oxides such as oxides of aluminum, iron, magnesium, titanium and vanadium and are subsequently cooled, the improvement which comprises subjecting the electrodes to a chlorine-containing atmosphere during the cooling stage while the electrodes are still at a relatively elevated temperature such that said metallic oxides are converted to chlorides and the chlorides are volatilized.

2. In methods of making improved shaped graphite electrodes wherein shaped carbon electrodes are heated to an elevated temperature sufficient to effect graphitization in the presence of contained catalytic amounts of non-volatile metal oxides such as oxides of aluminum, iron, magnesium, titanium and vanadium and are subsequently cooled, the improvement which comprises subjecting the electrodes to a chloridizing treatment with an inorganic chloridizing agent selected from the class consisting of chlorine and non-deleterious inorganic chlorides during the cooling stage while the electrodes are still at a relatively elevated temperature such that said metallic oxides are converted to chlorides and the chlorides are volatilized.

JOSEPH ARTHUR MUSGRAVE
WOODCOCK MITCHELL.